United States Patent Office 3,193,515
Patented July 6, 1965

3,193,515
METHOD OF PRODUCING POLYURETHANES
Rocco L. Mascioli, Media, Pa., assignor to Air Products and Chemicals, Inc., Philadelphia, Pa., a corporation of Delaware
No Drawing. Original application Apr. 4, 1960, Ser. No. 19,524, now Patent No. 3,127,404, dated Mar. 31, 1964. Divided and this application Dec. 28, 1962, Ser. No. 247,811
3 Claims. (Cl. 260—2.5)

This is a division of pending application Serial No. 19,524, filed April 4, 1960, now U.S. 3,127,404, issued March 31, 1964.

The present invention relates to molecular addition compounds of diazabicyclo-octane and compositions including the same, and their use as catalysts and promoters in condensation reactions, particularly in the formation of polyurethane plastics and foams.

While the synthesis of diazabicyclo-octane in small amounts had been known in earlier literature, it is only recently that this compound has become available in commercial quantities. It can be prepared in plant operation by the methods described in application Serial No. 628,723 of December 17, 1956 (now U.S. Patent No. 2,937,176 issued May 17, 1960). Because of its versatility as a catalyst coupled with high activity and balanced selectivity, this compound has found extensive use as a catalyst in the preparation of polyurethane elastomers, foams, and plastics made by reaction of organic diisocyanates with long chain polyols, including polyether and/or polyester compounds of 800 to 6000 molecular weight having reactive groups, particularly hydroxyl groups. Various formulations employing diazabicyclo-octane as catalyst in rigid and flexible foams, both of the poleyster and polyether types, have been described in the literature; see, for example, Aylesworth et al. in Modern Plastics, 1958, pages 145–154; the article in Chemical Processing of February 1959, pages 53 and 54; and Erner et al., "One Shot Urethane Foams," in Modern Plastics, February 1960, page 107. For specialized uses, formulations employing diazabicyclo-octane in association with other catalysts of the tertiary amine types or with organic tin compounds or tin soaps have been described in technical bulletins circulated to the industry. The physical and chemical properties of diazabicyclo-octane have been reported in Industrial and Engineering Chemistry of October 1959, at page 1299, and in the Journal of Chemical and Engineering Data of October 1959, at page 334.

In certain systems for forming flexible or rigid foams, it is desirable to slow down the rate of reaction between the isocyanate and the long chain polyol and/or the rate of release of the gaseous blowing agent ($CO_2$) produced by the reaction of isocyanate with water. Among suggested possibilities for accomplishing these ends, blocking of the activity of the catalyst component to obtain delayed catalytic reaction has in some selected instances shown good promise. Thus, in connection with diazabicyclo-octane as catalyst, the formation of certain molecular addition compounds thereof has already been described in copending U.S. application of William E. Erner et al., Serial No. 792,479 of February 11, 1959, now U.S. Patent 3,037,026 of May 29, 1962.

The present invention relates to new composition of matter having improved advantages as catalyst in polyurethane formulations.

In accordance with the present invention, such new compositions of matter are formed by admixing or reacting diazabicyclo-octane with (1) solutions of boric acid in a short chain polyhydric alcohol having at least two of the hydroxyl groups on adjacent carbon atoms, or with (2) the ester acids or partial esters formed by condensation of boric acid with such short chain polyhydric alcohols containing hydroxyl groups on adjacent carbon atoms. Specific examples of such blocking or retarding reagents for diazabicyclo-octane include the familiar glycol-boric acid and glycerol boric acid complexes, or solutions of boric acid in glycol or glycerol.

In forming addition compounds with diazabicyclo-octane, it is not necessary to employ the formed or isolated polyhydric alcohol-boric acid complex or partial ester, but the reaction mixture or solution obtained can be employed directly as such. For example, glycol-boric acid of the suggested structural formula

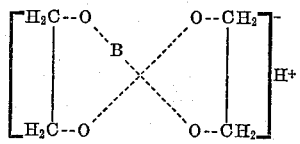

requires for its theoretical formation 2 mols of glycol per mol of boric acid—$H_3BO_3$—releasing 3 mols of water and forming a comparatively strong acid as a result of the available proton. To drive the reaction toward completion conditions need to be employed such that the released water is removed from the field of reaction. On the other hand, if the water is not removed, an equilibrium composition is obtained containing an amount of ester acid (partial ester) depending upon the temperature, proportions of reactants, and other conditions of the reaction. In association with diazabicyclo-octane for the purposes of the present invention, there may be employed those solutions or reaction mixtures containing unremoved water and unreacted components, in addition to any acid complex or partial ester formed.

Since alcohols, including polyhydric alcohols, will react with isocyanate it is preferred, for convenience, to employ catalyst solutions containing the diazabicyclo-octane-boric acid-polyol addition complex, which solutions do not have too great an excess of available hydroxyl groups; otherwise the proved polyurethane formulations, which have been worked out largely empirically, would need to be modified to compensate for the hydroxyls present which would compete in the alcohol-isocyanate reaction. For reaction with the diazabicyclo-octane, accordingly, there are preferably employed those products or solutions formed by dissolving not substantially less than ½ mol of boric acid per mol of glycerine or glycol; excess (unreacted) boric acid is not of itself detrimental except for unnecessarily loading the system with extraneous products. Generally it will be necessary to heat the mixture of boric acid and polyhydric alcohol to effect the required dissolution and acidic complex formation. With polyhydric alcohols having more than three hydroxyl groups, higher boric acid molar ratios should be employed to react with the additional hydroxyl groups. Such higher polyhydric alcohols having up to 6 carbon atoms and at least 2 adjacent hydroxyl groups similarly form comparatively strong acids by reaction with boric acid.

Since these behave as strong acids, the complexes of boric acid with diols, for example, form with diazabicyclo-octane ammonium salts or complexes of the type

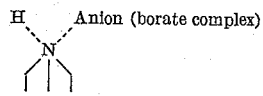

with one or both of the bridgehead N atoms quaternized and complexed, which can conveniently be dissociated at a desired stage in the formation of the polyurethane foam by the release of exothermic heat in the polyurethane foam reaction or by chemical reaction with components of the system, restoring the free tertiary amine for its initial catalytic activity.

In forming the addition compounds, it is not necessary that the diazabicyclo-octane be admixed in stoichiometric portions with the actual or potential acid content of the polyhydric alcohol-boric acid solution. In fact, a slight controlled excess of free tertiary amine may be desirable in certain formulations to promote the initial urethane condensation reaction between the isocyanate and alkyl ester resin or long chain polyol, additional free catalytic tertiary amine being subsequently released from the blocked addition compound during creaming, rising, or other stage of the foam forming process. The presence of a small amount of free and releasable water in the catalyst composition should be taken into consideration, particularly in connection with those formulations depending chiefly or entirely on the water-isocyanate reaction for blowing, in determining the quantity of added water needed for the desired blowing rate. It should be observed that in using the described catalytic solutions comprising the formed or potential glycol or other polyol complexes of boric acid, as water is used up in the blowing reaction, additional esterification or complex formation may take place between free boric acid and vicinal hydroxyl groups present, thereby further moderating or modifying the catalytic activity of the diazabicyclo-octane by reaction of the acid complex with diazabicyclo-octane.

*Example I*

(a) 92 parts by weight of glycerine were admixed with 38 parts by weight of boric acid and heated on a hot plate to 180° F. with stirring. After cooling the reaction mixture to approximately 100° F., there was stirred into the solution 55 parts by weight of diazabicyclo-octane. These proportions were based on using for each mol of glycerine approximately ½ mol of boric acid and about ½ mol of diazabicyclo-octane.

(b) The obtained reaction liquid which was in the form of a substantially clear solution was employed in a hand-mixed formulation for the preparation of a flexible polyurethane foam in the following proportions:

| | Parts by weight |
|---|---|
| Triol LG56 [1] | 40 |
| Polypropylene glycol (M.W. circa 2000) | 60 |
| Toluene diisocyanate (TDI 80–20) | 37 |
| Silicone oil | 1 |
| Water | 2.9 |
| Glycerol-boric acid-diazabicyclo-octane mixture from (a) to provide about 0.5 p.b.w. diazabicyclo-octane | 1.6 |

[1] Condensation product of glycerine with propylene oxide of about 3000 M.W. having a hydroxyl number of about 56.

The long chain polyols and diisocyanate were premixed with mechanical agitation for about a minute, after which the catalyst, water and silicone oil were added, stirred and poured into a suitable mold.

The above mixture produced a good foam of uniform texture which was tack-free in about ten minutes after rising. The cream time was about 60 seconds and the rise time about 300 seconds. Using free diazabicyclo-octane in equivalent amount in an otherwise identical formulation in hand-mix operation, the cream time is about 20 seconds and the rise time about 120 seconds. Corresponding machine-made foams with free diazabicyclo-octane have a cream time of about 10 seconds or less.

The indicated delay in cream time obtained with the blocked catalyst is particularly advantageous in permitting a longer pour time and a deeper pour in machine-mixed foams in which the liquid mixture is discharged continuously on a moving conveyor, as in making foam slabs.

*Example II*

A foam formulation similar to that of the previous example was employed, but substituting a mixture of glycolboric acid-diazabicyclo-octane for the glycerine mix. This mixture was prepared from 2 mols of glycol to 1 mol of boric acid and 1 mol of diazabicyclo-octane added to the solution with stirring. In the foam formulation there was employed 1.33 parts of the glycol-boric acid solution of diazabicyclo-octane to provide 0.5 part of diazabicyclo-octane per 100 parts of polyols.

The mixture creamed in 35 seconds and had a rise time of 150 seconds, producing a foam of good texture, well-distributed closed-cell structure and low density.

Delayed action catalysts, such as those of the present invention, find use not only in machine-mixed formulations for obtaining a desirably high rise, but also for foamed-in-place compositions, in which deep pour or delayed creaming is advantageous. While in the examples above the boric acid-polyol complex addition compounds of diazabicyclo-octane showed delayed activity, in certain formulations these addition compounds may exhibit acceleration of activity. Such acceleration of foaming and setting is particularly valuable in spray coating with extraneous gas blown rigid polyurethane foams. In these formulations deep pour and height of rise are generally of less important consideration than the ability of the mix to foam almost instantaneously on leaving the spray gun and rise in comparatively short time without running.

In the typical rigid foam spray coating formulations at least a portion of the high molecular weight polyester or polyether is employed as a "prepolymer" or quasi prepolymer, produced by reaction of the hydroxy compound with part or all of the isocyanate. In a typical operation, the prepolymer in admixture with silicone oil is heated and atomized as it is discharged from a spray nozzle. There are also separately admixed further quantities of the polyol, catalyst and gaseous blowing agent, which admixture is spray discharged through a separate nozzle at a controlled ratio to the prepolymer mixture. The two sprayed solutions become mixed on contact after their discharge from the nozzles and are deposited in reacting admixture on the surface to be coated, whereon they form a rising foam.

*Example III*

| | Parts by weight |
|---|---|
| Component A: | |
| Prepolymer | 94 |
| Trichlorofluoromethane | 34 |
| Component B: | |
| Polyol resin | 69.4 |
| Diazabicyclo-octane 31% in mixture with glycerine-boric acid | 1.6 |
| Silicone oil | 1.0 |

The catalyst complex was dissolved in part of the polyol resin, which was a polypropylene oxide-sorbitol adduct made from about 10 mols of the oxide per mol of sorbitol (M.W. about 900, hydroxyl number 490, acid number 0.30). The prepolymer was prepared by reacting (with cooling) another portion of the same polyol resin with excess toluene diisocyanate sufficient to react with the remaining polyol resin of component B (4.5/1 ratio isocyanate equivalent weight to hydroxyl equivalent weight).

The components A and B were mixed and foaming started almost instantaneously.

*Example IV*

A formulation that may be employed for a rigid foam for coating by spray application is as follows:

| | Parts by weight |
|---|---|
| Component A: | |
| Prepolymer | 100 |
| Silicone oil | 0.5 |

Component B:

| | |
|---|---|
| Polyol | 44 |
| Trichlorofluoromethane | 25 |
| Catalyst | [1] 0.6 |

[1] Providing 0.6 part of diazabicyclo-octane as the active part from the glycol-boric acid solution of diazabicyclo-octane.

Depending upon the properties desired in the sprayed coating, the weight ratio of the B component to the A component may be varied from about 0.65 to 0.75. The above formulation is based on using a prepolymer providing about 25% excess-NCO for reaction with the polyol in Component B. The quantity of polyol, used chiefly as cross-linking agent, in Component B is, of course, that needed to react with the isocyanate. The specific quantity as given in the formulation above is based on using a tetrahydroxy compound of about 240 molecular weight (e.g., tetraethanol ethylene diamine).

Example V

A formulation for a low density open-celled flexible ester type foam is as follows:

| | Parts by weight |
|---|---|
| Hydroxy polyester resin of dimer acid [1] | 100 |
| Tolylene diisocyanate (100% of theoretical) | 34.6 |
| Sufficient complex to furnish diazabicyclo-octane | 0.4 |
| Water | 2.9 |

[1] Made from polymerized $C_{18}$ unsaturated fatty acids (1 mol) and diethylene glycol (1.5 mols), having a hydroxy number of 74 and acid value of 1.8.

Obviously many modifications and variations of the invention as hereinbefore set forth may be made without departing from the spirit and scope thereof, and therefore only such limitations should be imposed as are indicated in the appended claims.

What is claimed is:

1. In the method of producing cellular polyurethane by reacting a precursor composition comprising tolylene diisocyanate and a hydroxly-containing compound selected from the group consisting of a polyether and a polyester, the hydroxy-containing compound being present in a quantity by weight larger than the quantity by weight of tolylene diisocyanate, said precursor compositon containing a blowing agent and also containing 1,4-diaza(2.2.2)bicyclooctane in a concentration of about 0.5% of said hydroxyl-containing compound, the improvement which consists essentially of delaying the action of a portion of the 1,4-diaza(2.2.2)bicyclooctane catalyst by including such portion of the 1,4-diaza(2.2.2)bicyclooctane as a composition prepared by reacting a lower polyol having alcoholic hydroxyl groups on adjacent carbon atoms with an amount of boric acid corresponding to at least one-half mol of boric acid per mol of polyol to prepare a glycolborate acid, and reacting the glycolborate acid with at least one-half mol of 1,4-diaza(2.2.2)bicyclooctane per mol of acid to prepare a glycolborate salt-like addition product of 1,4-diaza(2.2.2)bicyclooctane.

2. In the method of producing cellular polyurethane by the reaction occurring in a precursor composition comprising an organic diisocyanate, a hydroxyl-containing compound selected from the group consisting of a polyether and a polyester, and a blowing agent, said reaction being catalyzed by the presence in said composition of a catalytic amount of 1,4-diaza(2.2.2)bicyclooctane, the improvement which consists essentially of delaying the action of at least a portion of the 1,4-diaza(2.2.2)bicyclooctane by including such portion of the 1,4-diaza(2.2.2)bicyclooctane as a composition prepared by reacting a lower polyol having alcoholic hydroxyl groups on adjacent carbon atoms with an amount of boric acid corresponding to at least one-half mol of boric acid per mol of polyol to prepare a glycolborate acid, and reacting the glycolborate acid with at least one-half of 1,4-diaza(2.2.2)bicyclooctane per mol of acid to prepare a glycolborate salt-like addition product of 1,4-diaza(2.2.2)bicyclooctane.

3. The methof of producing a cellular polyurethane composition consisting essentially of the steps of mixing a precursor composition comprising a major molar amount of a mixture of organic diisocyanate, a hydroxyl-containing compound selected from the group consisting of a polyether and a polyester, and a blowing agent, and a catalytic amount of a composition prepared by reacting a lower polyol having alcoholic hydroxyl groups on adjacent carbon atoms with an amount of boric acid corresponding to at least one-half mol of boric acid per mol of polyol to prepare a glycolborate acid, and reacting the glycolborate acid with at least one-half mol of 1,4-diaza(2.2.2)bicyclooctane per mol of acid to prepare a glycolborate salt-like addition products of 1,4-diaza(2.2.2)bicyclooctane, said precursor composition undergoing a transformation into a polyurethane composition possessing improved properties by reason of the delayed action of a portion of the 1,4-diaza(2.2.2)bicyclooctane catalyst.

No references cited.

LEON J. BERCOVITZ, *Primary Examiner.*

DONALD E. CZAJA, *Examiner.*

UNITED STATES PATENT OFFICE
CERTIFICATE OF CORRECTION

Patent No. 3,193,515                                               July 6, 1965

Rocco L. Mascioli

It is hereby certified that error appears in the above numbered patent requiring correction and that the said Letters Patent should read as corrected below.

Column 5, line 29, for "hydroxy" read -- hydroxyl --; line 39, for "hydroxyl" read -- hydroxyl- --; line 41, for "hydroxy-" read -- hydroxyl- --; column 6, line 23, after "one-half" insert -- mol --; line 27, for "methof" read -- method -- same column 6, line 40, for "products" read -- product --.

Signed and sealed this 18th day of January 1966.

(SEAL)
Attest:

ERNEST W. SWIDER                                        EDWARD J. BRENNER
Attesting Officer                                            Commissioner of Patents